July 29, 1969   E. GLUNZ   3,457,719
PLASTIC BEARING BUSHING
Filed Jan. 23, 1967

3,457,719
PLASTIC BEARING BUSHING
Ernst Glunz, Trossingen, Germany, assignor to Kienzle Uhrenfabriken G.m.b.H., Schwenningen (Neckar), Germany, a limited-liability company of Germany
Filed Jan. 23, 1967, Ser. No. 610,938
Claims priority, application Germany, Feb. 3, 1966, K 53,498
Int. Cl. G04b 31/00
U.S. Cl. 58—52                                   7 Claims

ABSTRACT OF THE DISCLOSURE

For clockworks, a spindle or arbor plastic bearing bushing cast into a preformed hole in a clock frame is provided with uniformly peripherally-spaced and like necked lobes which key into mating portions of the hole so that when the bushing shrinks upon cooling, the bushing is wedged tightly in the hole outer from the necks.

---

The present invention relates to a plastic or resin bearing bushing especially for spindle bearings for timepieces wherein the bushing is mounted in a metal clockwork plate.

When plastic bearing bushings are formed in a sheet for a clockwork plate or frame sheet by injection molding it is necessary that the bushing be safely secured against falling out since the shrinkage of the plastic during cooling can introduce unacceptable size tolerances. Plastic bearings in some arts are made generally and satisfactorily by means of injection molding by the inclusion of integral collars or shoulders on bushings at the inner and outer faces respectively of the plate in which the bearings are cast. However in the clock art there is not always enough space for these collars, especially in small works. Besides this, the collars necessitate use of a rather complicated injection mold.

By means of the present invention the above drawbacks are minimized. In the invention the aperture in the work plate lies about tangential to the bearing bushing and is provided with keying recess extensions. By this construction the plastic of the bearing bushing is wedged against the walls of the keying extensions when the molded plastic cools and shrinks. The bushing is thus held in a stable position in the aperture in the work plate without the need for additional holding collars.

The key- or wedge-forming extensions of the aperture are preferably of the shape of major segments of a circle. The whole aperture may be considered to be of circular shape having the center at the axis of the arbor to be carried by the bearing bushing and over-lapped and surrounded by several equally spaced circular cut-outs having major arcs meeeting with the central hole. In situations where large forces subject the bushing to great stress a portion of the bushing may overlie the inner face of the plate.

Figure 3:
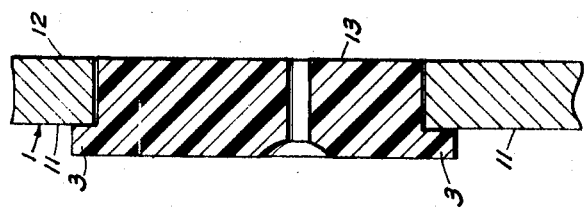
FIG. 3 shows a modification of the invention.
Figure 2:
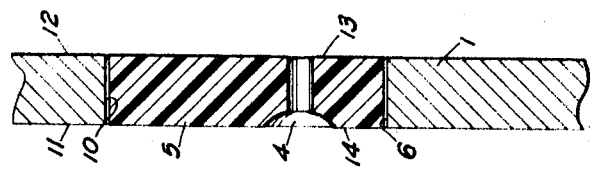
FIG. 2 is a sectional view showing the plate, the section being taken along the line 2—2 of FIG. 1 looking in the direction of the arrows of said line.
Figure 1:
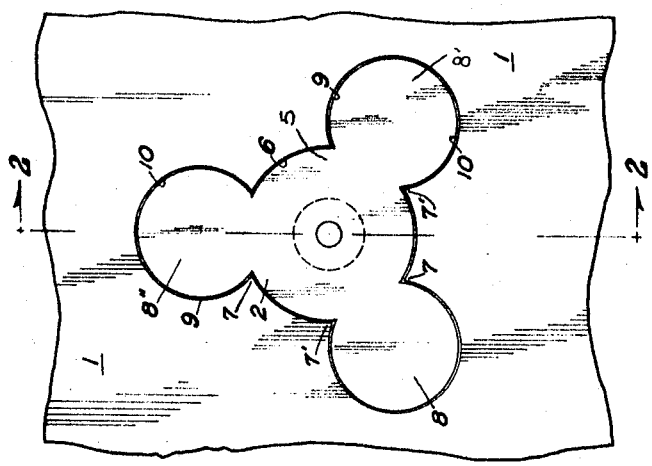
FIG. 1 is a front elevation showing the invention.

The clockwork plate or frame 1 is of metal or generally similar suitable material and is provided with an aperture 2 in which is molded, as by injection molding, a bearing member or bushing 5 of plastic. The composition of the plastic in general is not critical and may be such as nylon, acetal resin mixed with "Teflon" short fibers, or similar plastics. The composition may in particular be one which shrinks upon cooling after being cast.

The bearing member has cast therein or formed after cooling of the casting, a bearing seat or bore 4 to receive a clockwork arbor or spindle.

The aperture 2 has a plurality (shown as 3) of equally spaced minor arc shaped walls 6 of equal length about the center or axis of the bearing equidistant therefrom. Alternate ends of the arc shaped walls 6 form cusps 7 and 7' where these walls meet major arc circular walls such as shown at 9 of three partial circular cut-outs 10 of uniform size and spaced uniformly about the bore 4.

By casting the bearing bushing in this aperture, the bushing is formed with three lobes 8, 8' and 8" spaced 120° about the bore, each having a neck portion between a pair of cusps.

The process for injection molding can be quite simple. The work plate 1 may be placed between two die halves and the bearing bushing ends 14 and 13 molded substantially flush with the plate faces 11 and 12. Upon cooling and shrinking each lobe tends to move toward the center, but in so doing it engages at the opposite cusps 7 and 7' with a wedging action so that each lobe is under radial tension. Assuming the heat coefficient of contraction to be uniform throughout the plastic, i.e. that the plastic is uniform, the bushing is wedged in the aperture at six points all to the same degree of tightness, and in substantially like manner. For this reason it is possible to mold the arbor bore in its predetermined central location without danger of the bore being laterally displaced during shrinkage of the bearing material.

While other geometric shapes may be used to provide the keying and wedging, the partial circular shapes are preferred since they provide uniform distribution of the internal stresses and the hole can be punched out with a set of simple cylindrical punches or even with only one cylindrical punch.

When the axial thrust on the bushing is high, portions such as at 3 of the bushing may be provided, by modifying the inner half of the mold, to overlie the inner face 11 of the work plate margins at the aperture both to strengthen the bushing against bending and shear, and prevent the bushing from being pushed out.

The invention claimed is:

1. In a clockwork, a metal clockwork frame plate, said plate, being provided with an aperture having an axis perpendicular to said plate, said aperture having a series of congruent, arcuately-shaped walls, angularly spaced equidistant from said axis, the plate having keying recesses as portions of the aperture between said walls and extending radially from said axis and of increasing width away from the axis, a plastic bearing bushing in the aperture and provided with integral radially extending keying portions of approximately the same size and shape as the recesses, said bushing being under radial tension to wedge the keying portions against opposite walls of the keying recesses and hold the bushing in the aperture.

2. In a clockwork as claimed in claim 1, the material of the bushing having the property of relative shrinking upon cooling after being cast in a metal form.

3. In a clockwork as claimed in claim 1, said recesses being all alike in shape and each being symmetrical about a radial line from said axis.

4. In a clockwork as claimed in claim 3, said recesses being in the shape of portions of circles.

5. In a clockwork as claimed in claim 4, the recesses being three in number.

6. In a clockwork as claimed in claim 2, the bushing being completely within the aperture and recesses.

7. In a clockwork as claimed in claim 2, a portion of the bushing overlying a margin of the aperture and at only one face of the frame plate.

References Cited

UNITED STATES PATENTS

| | | | |
|---|---|---|---|
| 2,246,086 | 6/1941 | Austin | 308—238 |
| 2,459,598 | 1/1949 | Stott | 308—238 |
| 2,956,394 | 10/1960 | Du Bois | 58—140 |

RICHARD B. WILKINSON, Primary Examiner

L. H. HAMBLEN, Assistant Examiner

U.S. Cl. X.R.

58—140